US012801926B2

(12) United States Patent
Jiang et al.

(10) Patent No.: US 12,801,926 B2
(45) Date of Patent: Nov. 17, 2026

(54) ATMOSPHERIC VISIBILITY PREDICTION METHOD BASED ON DBN

(71) Applicant: Shaanxi University of Technology, Hanzhong (CN)

(72) Inventors: Yuan Jiang, Hanzhong (CN); Yufeng Wang, Hanzhong (CN)

( * ) Notice: Subject to any disclaimer, the term of this patent is extended or adjusted under 35 U.S.C. 154(b) by 757 days.

(21) Appl. No.: 18/107,040

(22) Filed: Feb. 8, 2023

(65) Prior Publication Data

US 2023/0274148 A1 Aug. 31, 2023

Related U.S. Application Data

(63) Continuation of application No. PCT/CN2022/118116, filed on Sep. 9, 2022.

(30) Foreign Application Priority Data

Feb. 28, 2022 (CN) ......................... 202210189526.3

(51) Int. Cl.
*G06N 3/04* (2023.01)
*G06N 3/084* (2023.01)

(52) U.S. Cl.
CPC ............... *G06N 3/084* (2013.01); *G06N 3/04* (2013.01)

(58) Field of Classification Search
CPC ........ G06N 3/045; G06N 3/084; G06N 3/048; G06N 3/04
See application file for complete search history.

(56) References Cited

PUBLICATIONS

Github user: ad889a82; "Loss Functions"; "ml-cheatsheet" (Year: 2017).*
Affek; "Understanding the scaling of L^2 regularization in the context of neural networks" (Year: 2018).*
Guo et al.; "Establishment of Air Quality Forecast Model Based on Deep Learning" (Year: 2020).*
Machine Learning for Science Team; "Restricted Boltzmann Machine" (Year: 2020).*
Nielsen; "Chapter 2: How the backpropagation algorithm works" (Year: 2019).*
Pandey et al; "Comparative Analysis of KNN Algorithm using Various Normalization Techniques" (Year: 2017).*
Yang; "Medical Multimedia Big Data Analysis Modeling Based on DBN Algorithm" (Year: 2019).*

* cited by examiner

*Primary Examiner* — David Yi
*Assistant Examiner* — Andrew Bracero

(57) ABSTRACT

An atmospheric visibility prediction method based on deep belief networks (DBN) includes steps of establishing a DBN model, determining a network input parameter, preprocessing input data, preferably selecting the number of hidden layers and the number of nodes in each layer, training the DBN model and predicting atmospheric visibility. According to the method, an output layer of the DBN model is a back propagation (BP) network, an output feature vector of a restricted Boltzmann machine (RBM) is received as an input feature vector, and an entity relationship classifier is trained in a supervised way. A process of training a model by an RBM network can be regarded as initialization of a deep BP network weight parameter, such that the DBN overcomes defects that the BP network is prone to local optimization and is long in training time.

3 Claims, 3 Drawing Sheets

ATMOSPHERIC VISIBILITY PREDICTION METHOD BASED ON DBN

CROSS REFERENCE TO THE RELATED APPLICATIONS

This application is the continuation application of International Application No. PCT/CN2022/118116, filed on Sep. 9, 2022, which is based upon and claims priority to Chinese Patent Application No. 202210189526.3, filed on Feb. 28, 2022, the entire contents of which are incorporated herein by reference.

TECHNICAL FIELD

The present disclosure relates to an atmospheric visibility prediction method, particularly relates to an atmospheric visibility prediction method based on deep belief networks (DBN), and belongs to the technical field of intelligent breeding.

BACKGROUND

As an important meteorological parameter, atmospheric visibility can significantly reflect a degree of air pollution. It is not only a key indicator of atmospheric transparency, but also a vital basis for air quality evaluation. The atmospheric visibility has great research significance in transportation, navigation, aviation and national defense and military activities. Therefore, accurate prediction and forecast of the atmospheric visibility plays a considerable role in urban air pollution control, public traffic security and people's life and property safety protection. A deep belief network (DBN) algorithm is an extremely practical deep learning algorithm, and is based on a statistical probability generation model. DBN has desirable application scalability, and has achieved good application results in handwriting font recognition, speech segment recognition, digital video image processing, etc.

SUMMARY

To solve a technical problem, the present disclosure provides an atmospheric visibility prediction method based on deep belief networks (DBN).

To solve the above technical solution, the present disclosure uses the technical solution as follows:

The atmospheric visibility prediction method based on DBN includes the following steps:

step 1: establishing a DBN model including an input layer, hidden layer 1-hidden layer n and an output layer that are cascaded in sequence, where the output layer is a back propagation (BP) network; the hidden layer 1-hidden layer n are all restricted Boltzmann machines (RBM); a corresponding output terminal of the input layer is connected to a corresponding input terminal of the hidden layer 1; and a corresponding output terminal of hidden layer i is connected to a corresponding input terminal of hidden layer i+l, 1<i<n, and a corresponding output terminal of the hidden layer n is connected to a corresponding input terminal of the output layer;

step 2: determining a network input parameter: using a principal component analysis method to determine a type of the network input parameter;

step 3: preprocessing input data: normalizing the input data in advance; and dividing the input data into a training set and a prediction set;

step 4: preferably selecting the number of hidden layers and the number of nodes in each layer: preferably selecting the number of hidden layers with visibility prediction accuracy as a target within a predetermined range of the number of layers according to a step size of the preset number of layers; and then preferably selecting the number of nodes in hidden layers with visibility prediction accuracy as a target within a predetermined range of the number of nodes according to the preset number of nodes in hidden layers;

step 5: training the DBN model: pre-training initial parameters of the hidden layer 1-hidden layer n layer by layer, and then adjusting the initial parameters of each hidden layer finely through an error back propagation method, where each hidden layer includes 1 visible layer and 1 hidden layer, and the initial parameters of each hidden layer include a weighting matrix W, a visible layer bias coefficient vector a and a hidden layer bias coefficient vector b; an energy function is:

$$E(v,h)=-a^T v-b^T h-h^T W v \tag{1}$$

an optimization objective function is:

$$L(W,a,b)=-\Sigma\ \ln(P(V_{(i)})) \tag{2}$$

a probability that the nodes in the hidden layers convert from a visual state to a visible state is:

$$P(h_j=1|v)=\text{sigmoid}(b_j+W_{j,:}v) \tag{3}$$

a probability that the nodes in the hidden layers convert from a visual state to a hidden state is:

$$P(v_j=1\,|\,h)=sigmoid\left(a_j+W_{:,j}^T h\right) \tag{4}$$

an objective function of adjusting the initial parameters of each hidden layer finely through the error back propagation method is:

$$\begin{aligned} J(W,b) &= \frac{1}{m}\sum_{i=1}^{m} J\left(W,b;x^{(i)},y^{(i)}\right)+\frac{\lambda}{2}\sum_{l=1}^{L-1}\left\|W^{(l)}\right\|_F^2 \\ &= \frac{1}{m}\sum_{i=1}^{m}\frac{1}{2}\left\|h\left(x^{(i)}\right)-y^{(i)}\right\|^2+\frac{\lambda}{2}\sum_{l=1}^{L-1}\left\|W^{(l)}\right\|_F^2 \end{aligned} \tag{5}$$

in the formula, a first term is an error term, and a second term is called a "regularization term", which are used to control an element size of a weight matrix of each layer, to prevent the weight matrix from being too large and avoid over-fitting of a network model;

a variable $$\delta_i^{(l)}$$

is a partial derivative of a final error for a variable of a node in each layer before an activation function, which is used to measure a contribution value of a certain node in a certain layer for the final error, and an expression of $$\delta_i^{(l)}$$

is as follows:

$$\delta_i^{(l)} = \frac{\partial}{\partial z_i^{(l)}} J\left(W, b; x^{(i)}, y^{(i)}\right) \tag{6}$$

for a final layer, that is, layer L, $$\begin{aligned} \delta_i^{(L)} &= \frac{\partial}{\partial z_i^{(L)}}\left(\frac{1}{2}\|y - h(x)\|^2\right) \\ &= \frac{\partial}{\partial a_i^{(L)}}\left(\frac{1}{2}\|y - h(x)\|^2\right) \cdot \frac{\partial a_i^{(L)}}{\partial z_i^{(L)}} \\ &= \frac{1}{2}\left[\frac{\partial}{\partial a_i^{(L)}} \sum_{j=1}^{S_L} \left(y_j - a_j^{(L)}\right)^2\right] \cdot \frac{\partial a_i^{(L)}}{\partial z_i^{(L)}} \\ &= -\left(y_i - a_i^{(L)}\right) f'\left(z_i^{(L)}\right) \end{aligned} \tag{7}$$

where $$f'\left(z_i^{(L)}\right) = a_i^{(L)}\left(1 - a_i^{(L)}\right) \tag{8}$$

for other layers (l=L−1, L−2, . . . 2), $$\begin{aligned} \delta_i^{(l)} &= \frac{\partial}{\partial z_i^{(l)}} J(W, b; x, y) \\ &= \sum_{j=1}^{s_{l+1}} \frac{\partial J}{\partial z_j^{(l+1)}} \cdot \frac{\partial z_j^{(l+1)}}{\partial z_i^{(l)}} \\ &= \sum_{j=1}^{s_{l+1}} \delta_j^{(l+1)} \cdot W_{ji}^{(l)} f'\left(z_i^{(l)}\right) \\ &= \left(\sum_{j=1}^{s_{l+1}} W_{ji}^{(l)} \delta_j^{(l+1)}\right) \cdot f'\left(z_i^{(l)}\right) \end{aligned} \tag{9}$$

where $$z_j^{(l+1)} = \left[\sum_{i=1}^{s_l} W_{ji}^{(l)} \cdot f\left(z_i^{(l)}\right)\right] + b_j^{(l)} \tag{10}$$

$$\frac{\partial z_j^{(l+1)}}{\partial z_i^{(l)}} = W_{ji}^{(l)} f'\left(z_i^{(l)}\right) \tag{11}$$

the weighting matrix W, the visible layer bias coefficient vector a, and the hidden layer bias coefficient vector b are iterated until a difference between two iteration results is less than a preset threshold, and a parameter update method is:

update formulas of various parameters are as follows:

$$W_{ij}^{(l)} = W_{ij}^{(l)} - \alpha \frac{\partial J(W, b)}{\partial W_{ij}^{(l)}} \tag{12}$$

$$b_i^{(l)} = b_i^{(l)} - \alpha \frac{\partial J(W, b)}{\partial b_i^{(l)}} \tag{13}$$

where $\alpha$ is a learning rate;

$$\frac{\partial J}{\partial W^{(l)}} = \delta^{(l+1)}\left(a^{(l)}\right)^T \tag{14}$$

$$\frac{\partial J}{\partial b^{(l)}} = \delta^{(l+1)} \tag{15}$$

for the output layer:

$$\delta^{(L)} = -(y - a^{(L)}) \cdot f'(z^{(L)}) \tag{16}$$

for other layers (l=L−1, L−2, . . . 2):

$$\delta^{(l)} = [(W^{(l)})^T \delta^{(l\pm1)}] \cdot f'(z^{(l)}) \tag{17}$$

a partial derivative of an objective function of each sample for each parameter is used as a feedback control signal, and weight update is controlled to minimize a loss function; and step 6: predicting atmospheric visibility: using prediction, data and a trained DBN model, to predict the atmospheric visibility.

Furthermore, in step 3, a min-max normalization method is used, and a conversion formula is expressed as:

$$x' = \frac{x - \min(x)}{\max(x) - \min(x)} \tag{18}$$

where x' is converted data, max(x) is a maximum value in all data, and min(x) is a minimum value in all data.

Furthermore, in step 3, a Z-score normalization method is used, and a conversion formula is expressed as:

$$x' = \frac{x - \bar{x}}{\sigma} \tag{19}$$

where $\bar{x}$ is a mean of all data, and $\sigma$ is a standard deviation of data.

Furthermore, in step 5, each layer is trained independently, each hidden layer uses an unsupervised learning method, and the output layer uses a supervised learning method.

With the above technical solution, beneficial effects are achieved as follows:

(1) The DBN model suitable for atmospheric visibility prediction established by the present disclosure has strong learning ability, wide coverage, high adaptability and desirable portability, and does not need manual feature designing, only rules are learned according to data self-training and a data structure, and then an output result closest to an expectation is obtained.

(2) The present disclosure uses a theory based on deep learning and a prediction network model, to achieve accurate prediction of the atmospheric visibility, which has a considerable effect on urban air pollution control, public traffic security and people's life and property safety protection.

(3) According to the present disclosure, the output layer of the DBN model is the BP network, an output feature vector of the RBM is received as an input feature vector, and an entity relationship classifier is trained in a supervised way. A process of training a model by an RBM network may be regarded as initialization of a deep BP network weight parameter, such that DBN overcomes defects that the BP network is prone to local optimization and is long in training time.

DETAILED DESCRIPTION OF THE EMBODIMENTS

Figure 1:
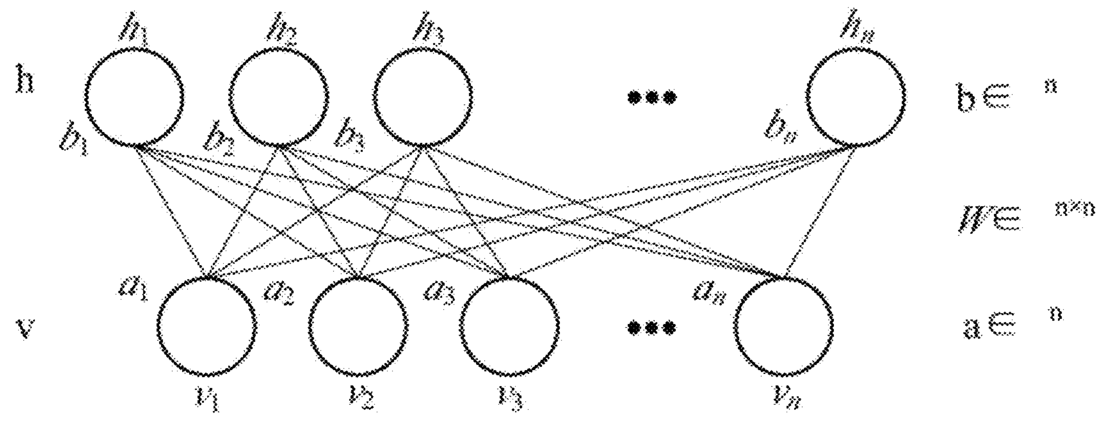
FIG. 1 is a schematic diagram of a deep belief network (DBN) model of the present disclosure.
Figure 2:
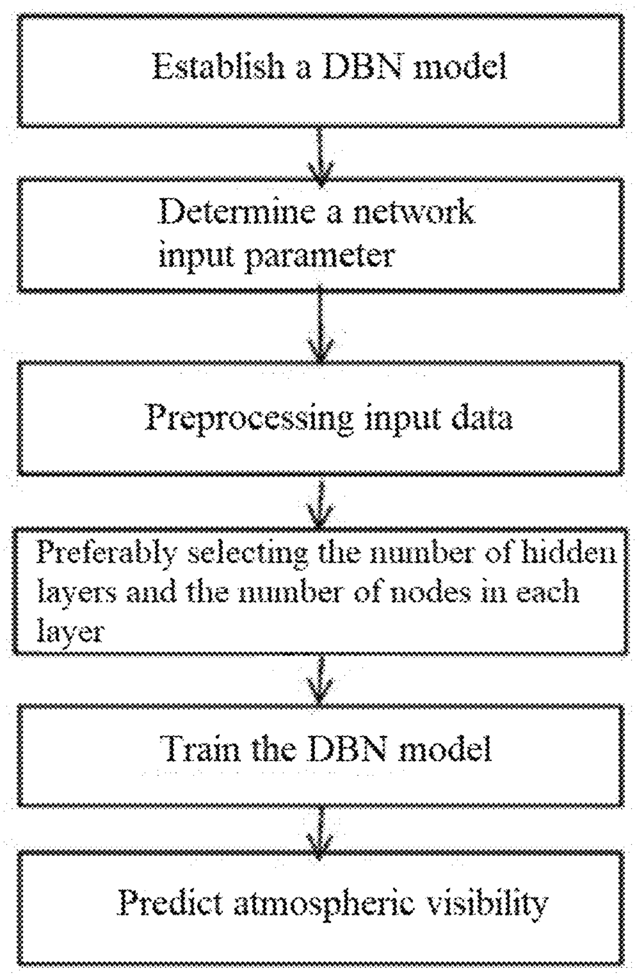
FIG. 2 is a flow diagram of the present disclosure.
Figure 3:
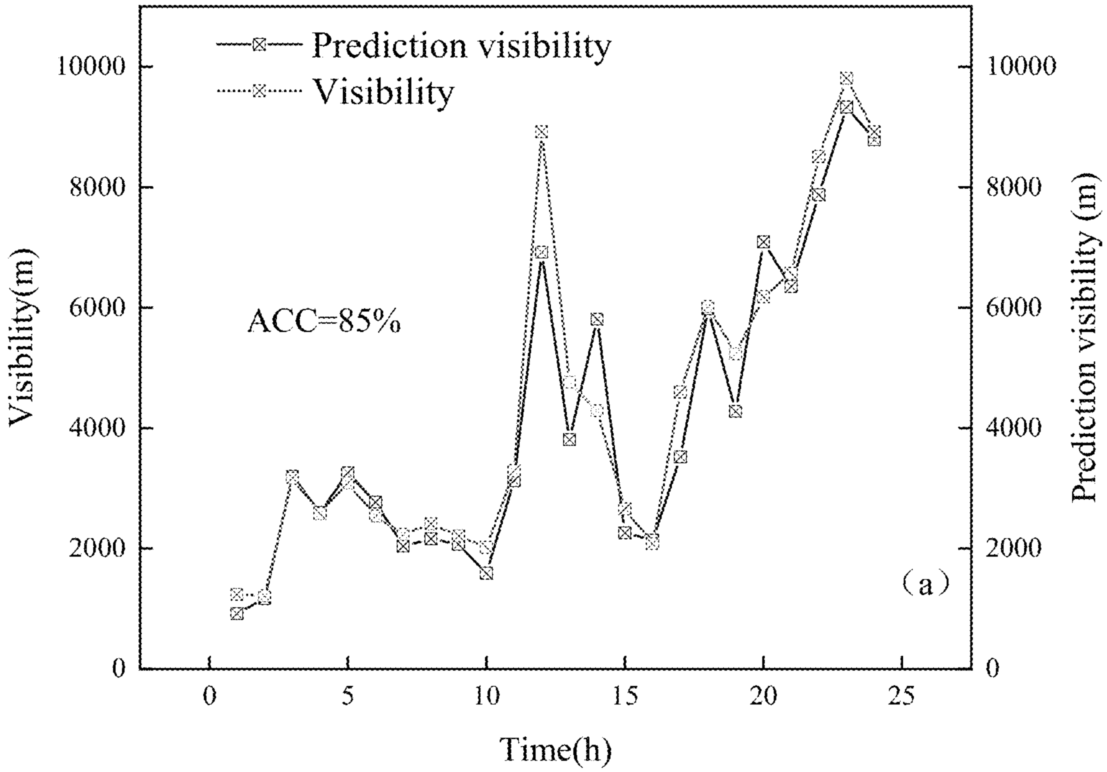
FIG. 3 shows a visibility prediction result of Embodiment 1 of the present disclosure.
Figure 4:
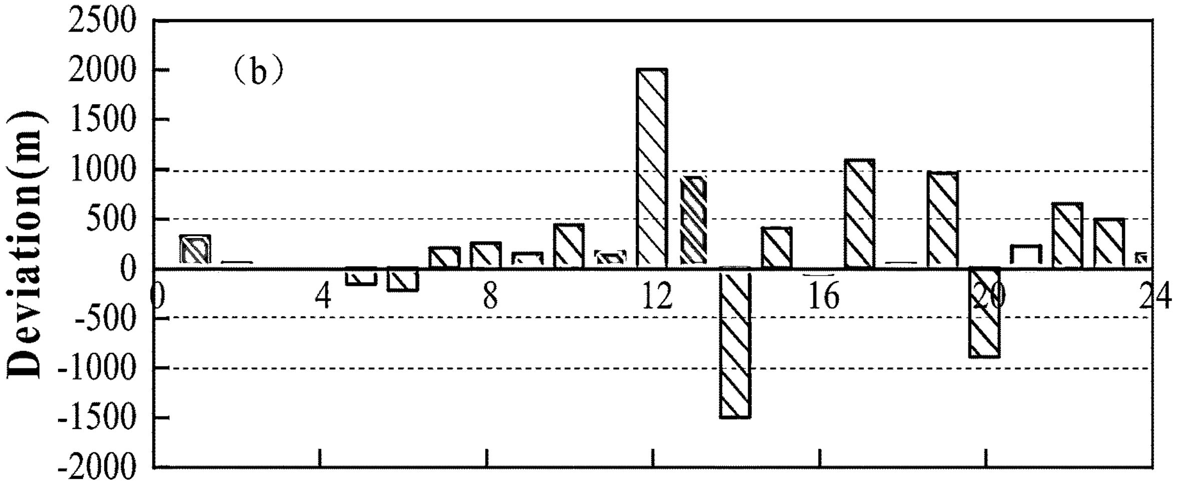
FIG. 4 is a deviation diagram of Embodiment 1 of the present disclosure.
Figure 5:
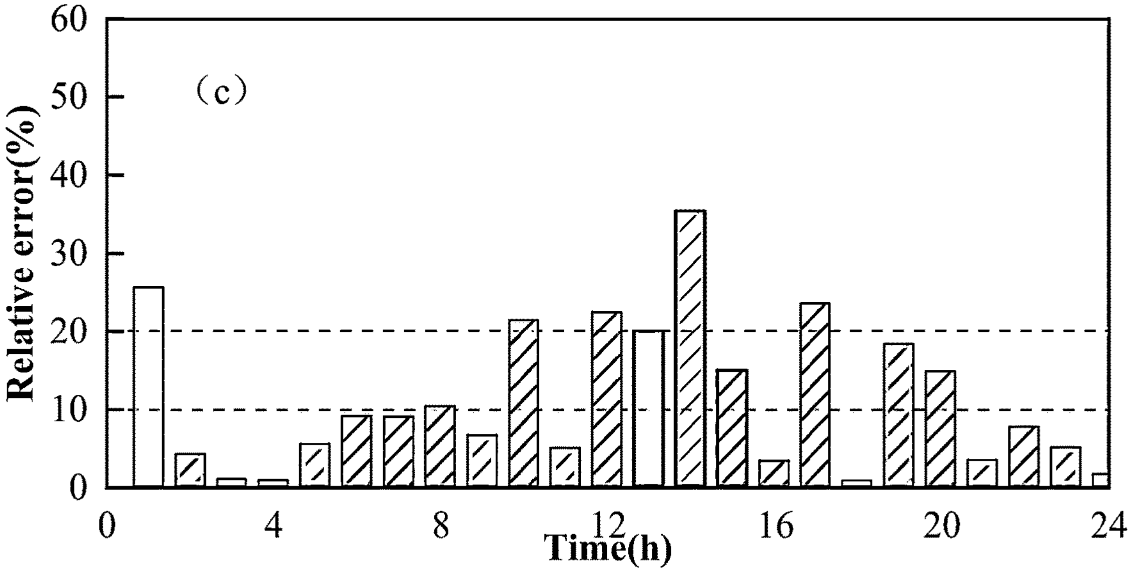
FIG. 5 is an error diagram of visibility prediction of Embodiment 1 of the present disclosure.

An atmospheric visibility prediction method based on deep belief networks (DBN) includes the following steps:

Step 1: a DBN model is established, including an input layer, hidden layer 1-hidden layer n and an output layer that are cascaded in sequence, where the output layer is a back propagation (BP) network; the hidden layer 1-hidden layer n are all restricted Boltzmann machines (RBM); a corresponding output terminal of the input layer is connected to a corresponding input terminal of the hidden layer 1; and a corresponding output terminal of hidden layer i is connected to a corresponding input terminal of hidden layer i+l, 1<i<n, and a corresponding output terminal of the hidden layer n is connected to a corresponding input terminal of the output layer.

Step 2: a network input parameter is determined, specifically, a principal component analysis method is used to determine a type of the network input parameter.

Step 3: input data is preprocessed, specifically, the input data is normalized in advance; and the input data is divided into a training set and a prediction set.

Step 4: the number of hidden layers and the number of nodes in each layer are preferably selected, specifically, the number of hidden layers is preferably selected with visibility prediction accuracy as a target within a predetermined range of the number of layers according to a step size of the preset number of layers; and then the number of nodes in hidden layers is preferably selected with visibility prediction accuracy as a target within a predetermined range of the number of nodes according to the preset number of nodes in hidden layers.

Step 5: the DBN model is trained, specifically, initial parameters of the hidden layer 1-hidden layer n are pre-trained layer by layer, and then the initial parameters of each hidden layer are finely adjusted through an error back propagation method.

Each hidden layer includes 1 visible layer and 1 hidden layer, and the initial parameters of each hidden layer include a weighting matrix W, a visible layer bias coefficient vector a and a hidden layer bias coefficient vector b; an energy function is:

$$E(v,h)=-a^T v-b^T h-h^T W v \quad (1)$$

In a training process, for m samples in the training set, a logarithmic loss function is usually used to minimize an expectation in RBM An optimization objective function is:

$$L(W,a,b)=-\Sigma \ln(P(V_{(i)})) \quad (2)$$

In an optimization process, a gradient descent method is used to obtain W, a and b through iteration. In the embodiment, learning efficiency is 0.1, and the number of iterations is 5000.

An objective function of adjusting the initial parameters of each hidden layer finely through the error back propagation method is:

$$\begin{aligned} J(W,b) &= \frac{1}{m}\sum_{i=1}^{m} J\left(W,b;x^{(i)},y^{(i)}\right)+\frac{\lambda}{2}\sum_{l=1}^{L-1}\left\|W^{(l)}\right\|_F^2 \\ &= \frac{1}{m}\sum_{i=1}^{m}\frac{1}{2}\left\|h\left(x^{(i)}\right)-y^{(i)}\right\|^2+\frac{\lambda}{2}\sum_{l=1}^{L-1}\left\|W^{(l)}\right\|_F^2 \end{aligned} \quad (3)$$

In the formula, there is not only the sum of all sample optimization objects but two terms, specifically, a first term is an error term, and a second term is called a "regularization term", which are used to control an element size of a weight matrix of each layer, to prevent the weight matrix from being too large and avoid over-fitting of a network model.

A gradient descent algorithm is used to optimize a neural network, and a partial derivative of the objective function for each function is obtained, such that the update formulas of various parameters are as follows:

$$W_{ij}^{(l)} = W_{ij}^{(l)} - \alpha\frac{\partial J(W,b)}{\partial W_{ij}^{(l)}} \quad (4)$$

$$b_i^{(l)} = b_i^{(l)} - \alpha\frac{\partial J(W,b)}{\partial b_i^{(l)}} \quad (5)$$

a is a learning rate, which is used to control update of weights and bias terms. In view of this, derivatives of an objective function J(W, b) for all elements such as a weight matrix and a bias term may be obtained:

$$\frac{\partial J(W,b)}{\partial W_{ij}^{(l)}} = \left[\frac{1}{m}\sum_{i=1}^{m}\frac{\partial J\left(W,b;x^{(i)},y^{(i)}\right)}{\partial W_{ij}^{(l)}}\right]+\lambda W_{ij}^{(l)} \quad (6)$$

$$\frac{\partial J(W,b)}{\partial b_i^{(l)}} = \frac{1}{m}\sum_{i=1}^{m}\frac{\partial J\left(W,b;x^{(i)}y^{(i)}\right)}{\partial b_i^{(l)}} \quad (7)$$

Then partial derivatives of a sample objective function for a weight matrix and a bias vector are computed, a variable $$\delta_i^{(l)}$$

is introduced, which is a partial derivative of a final error for a variable of a node in each layer before an activation function, which is used to measure a contribution value of a certain node in a certain layer for the final error. An expression of $$\delta_i^{(l)}$$

is as follows:

$$\delta_i^{(l)} = \frac{\partial}{\partial z_i^{(l)}} J\left(W,b;x^{(i)},y^{(i)}\right) \quad (8)$$

for a final layer (layer L)

$$\begin{aligned}\delta_i^{(L)} &= \frac{\partial}{\partial z_i^{(L)}}\left(\frac{1}{2}\|y-h(x)\|^2\right) \\ &= \frac{\partial}{\partial a_i^{(L)}}\left(\frac{1}{2}\|y-h(x)\|^2\right)\cdot\frac{\partial a_i^{(L)}}{\partial z_i^{(L)}} \\ &= \frac{1}{2}\left[\frac{\partial}{\partial a_i^{(L)}}\sum_{j=1}^{S_L}\left(y_j-a_j^{(L)}\right)^2\right]\cdot\frac{\partial a_i^{(L)}}{\partial z_i^{(L)}} \\ &= -\left(y_i-a_i^{(L)}\right)f'\left(z_i^{(L)}\right)\end{aligned} \tag{9}$$

where $$f'\left(z_i^{(L)}\right) = a_i^{(L)}\left(1-a_i^{(L)}\right) \tag{10}$$

For auxiliary variables of other layers (l=L−1, L−2, . . . 2), a partial derivative of an error relative to a node of a next layer (that is, layer l+1) is known, the node of the next layer is directly related to the layer (layer l), then $$\begin{aligned}\delta_i^{(l)} &= \frac{\partial}{\partial z_i^{(l)}}J(W, b; x, y) \\ &= \sum_{j=1}^{s_{l+1}}\frac{\partial J}{\partial z_j^{(l+1)}}\cdot\frac{\partial z_j^{(l+1)}}{\partial z_i^{(l)}} \\ &= \sum_{j=1}^{s_{l+1}}\delta_j^{(l+1)}\cdot W_{ji}^{(l)}f'\left(z_i^{(l)}\right) \\ &= \left(\sum_{j=1}^{s_{l+1}}W_{ji}^{(l)}\delta_j^{(l+1)}\right)\cdot f'\left(z_i^{(l)}\right)\end{aligned} \tag{11}$$

where $$z_j^{(l+1)} = \left[\sum_{i=1}^{s_l}W_{ji}^{(l)}\cdot f\left(z_i^{(l)}\right)\right] + b_j^{(l)} \tag{12}$$

Then a partial derivative of a second term of a second line in Formula (11) may be easily obtained:

$$\frac{\partial z_j^{(l+1)}}{\partial z_i^{(l)}} = W_{ji}^{(l)}f'\left(z_i^{(l)}\right) \tag{13}$$

The weighting matrix W, the visible layer bias coefficient vector a, and the hidden layer bias coefficient vector b are iterated until a difference between two iteration results is less than a preset threshold. A parameter update method is:

$$W_{ij}^{(l)} = W_{ij}^{(l)} - \alpha\frac{\partial J(W, b)}{\partial W_{ij}^{(l)}} \tag{14}$$

$$b_i^{(l)} = b_i^{(l)} - \alpha\frac{\partial J(W, b)}{\partial b_i^{(l)}} \tag{15}$$

a is a learning rate.

The RBM obtains optimal parameters W, a and b by maximizing a likelihood function. Given a set of training samples D={$v_1$, $v_2$, . . . , $v_N$}, a log-likelihood function is $$L(D; W, a, b) = \frac{1}{N}\sum_{n=1}^{N}\log p(v_n; W, a, b) \tag{16}$$

In a restricted Boltzmann machine, partial derivatives of the log-likelihood function L(D;W,a,b) for parameters $w_{ij}$, $a_i$, $b_j$ are $$\frac{\partial L(D; W, a, b)}{\partial w_{ij}} = E_{p^\wedge(v)}E_{p(h|v)}[v_i h_j] - E_{p(v,h)}[v_i h_j] \tag{17}$$

$$\frac{\partial L(D; W, a, b)}{\partial a_i} = E_{p^\wedge(v)}E_{p(h|v)}[v_i] - E_{p(v,h)}[v_i] \tag{18}$$

$$\frac{\partial L(D; W, a, b)}{\partial b_j} = E_{p^\wedge(v)}E_{p(h|v)}[h_j] - E_{p(v,h)}[h_j] \tag{19}$$

p^(v) is an actual distribution of v on a training data set.

For simplicity, a value of the restricted Boltzmann machine is recorded as data. When a thermal equilibrium state is reached, values of v and h are collected and recorded as model. When a gradient ascent method is used, the parameters W, a and b may be approximately updated according to the following formulas:

$$w_{ij} \leftarrow w_{ij} + \alpha(\langle v_i h_j\rangle_{data} - \langle v_i h_j\rangle_{model}) \tag{20}$$

$$a_i \leftarrow a_i + \alpha(\langle v_i\rangle_{data} - \langle v_i\rangle_{model} \tag{21}$$

$$b_j \leftarrow b_j + \alpha(\langle h_j\rangle_{data} - \langle h_j\rangle_{model} \tag{22}$$

where a is a learning rate, and a>0.

With introduction of the auxiliary variables, a partial derivative of an error relative to a matrix element and a bias vector element is computed as follows:

$$\frac{\partial J}{\partial W_{ij}^{(l)}} = \delta_i^{(l+1)}\cdot a_j^{(l)} \tag{23}$$

For the output layer:

$$\delta^{(L)} = -(y-a^{(L)})\cdot f(z^{(L)}) \tag{24}$$

For other layers (l=L−1, L−2, . . . 2):

$$\delta^{(l)} = [(W^{(l)})^T\delta^{(l+1)}]\cdot f(z^{(l)}) \tag{25}$$

A weight and a bias term are updated to:

$$\frac{\partial J}{\partial W^{(l)}} = \delta^{(l+1)}\left(a^{(l)}\right)^T \tag{26}$$

$$\frac{\partial J}{\partial b^{(l)}} = \delta^{(l+1)} \tag{27}$$

A partial derivative of an objective function of each sample for each parameter is obtained, which is a gradient of each weight for computing a loss function in a network. The gradients may be fed back to an optimal optimization method, to update weights so as to minimize the loss function.

Step 6: atmospheric visibility is predicted, specifically, prediction, data and a trained DBN model are used to predict the atmospheric visibility.

Furthermore, in the step, a min-max normalization method is used, and a conversion formula is expressed as:

$$x' = \frac{x - \min(x)}{\max(x) - \min(x)} \quad (28)$$

where x' is converted data, max(x) is a maximum value in all data, and min(x) is a minimum value in all data.

Furthermore, in the step, a Z-score normalization method is used, and a conversion formula is expressed as:

$$x' = \frac{x - \bar{x}}{\sigma} \quad (29)$$

where $\bar{x}$ is a mean of all data, and σ is a standard deviation of data.

Data in the embodiment includes 8 data types. 5 main feature values are selected, as shown in Table 1. Prediction results are as shown in the figures.

| Parameter | PC1 | PC2 | PC3 | PC4 | PC5 |
|---|---|---|---|---|---|
| Wind speed | −0.303 | 0.036 | 0.537 | 0.239 | 0.536 |
| Temperature | 0.261 | 0.618 | −0.256 | −0.117 | 0.19 |
| Radiance | −0.32 | 0.462 | 0.143 | −0.019 | −0.494 |
| Wind direction | 0.081 | 0.005 | −0.391 | −0.051 | −0.038 |
| Pressure | −0.553 | −0.194 | 0.0823 | 0.136 | −0.385 |
| Humidity | 0.349 | −0.559 | 0.098 | 0.906 | −0.058 |
| PM2.5 | 0.461 | 0.04 | 0.306 | 0.071 | −0.527 |
| PM10 | 0.296 | 0.222 | 0.6 | 0.283 | 0.025 |

What is claimed is:

1. An atmospheric visibility prediction method based on deep belief networks (DBN), comprising:

step 1: establishing a DBN model comprising an input layer, hidden layer 1-hidden layer n, and an output layer, wherein the input layer, the hidden layer 1-hidden layer n, and the output layer are cascaded in sequence, wherein the output layer is a back propagation network; each of the hidden layer 1-hidden layer n is a restricted Boltzmann machine comprising 1 visible layer and 1 hidden layer, a corresponding output terminal of the input layer is connected to a corresponding input terminal of the hidden layer 1; and a corresponding output terminal of a hidden layer is connected to a corresponding input terminal of a hidden layer i+1, wherein 1<i<n, and a corresponding output terminal of the hidden layer n is connected to a corresponding input terminal of the output layer;

step 2: determining a network input parameter: using a principal component analysis method to determine a type of the network input parameter;

step 3: preprocessing input data relevant to atmospheric visibility: obtaining the input data relevant to atmospheric visibility, and normalizing the input data relevant to atmospheric visibility in advance, and dividing the input data relevant to atmospheric visibility into a training set and a prediction set; wherein the input data relevant to atmospheric visibility comprises: wind speed, temperature, radiance, wind direction, pressure, humidity, PM2.5 concentration, and PM10 concentration;

step 4: preferably selecting a number of hidden layers and a number of nodes in each layer: preferably selecting the number of hidden layers with a visibility prediction accuracy as a target within a predetermined range of the number of layers according to a step size of a preset number of layers, and then preferably selecting the number of nodes in the hidden layers with the visibility prediction accuracy as a target within a predetermined range of the number of nodes according to a preset number of nodes in the hidden layers;

step 5: training the DBN model: pre-training initial parameters of the hidden layer 1-hidden layer n layer by layer, and then adjusting the initial parameters of each hidden layer finely through an error back propagation method, wherein the initial parameters of each hidden layer comprise a weighting matrix W, a visible layer bias coefficient vector a and a hidden layer bias coefficient vector b; an energy function is:

$$E(v,h) = -a^T v - b^T h - h^T W v \quad (1)$$

an optimization objective function is:

$$L(W,a,b) = -\Sigma \ln(P(V_{(i)})) \quad (2)$$

a probability that the nodes in hidden layers convert from a visual state to a visible state is:

$$P(h_j = 1|v) = \text{sigmoid}(b_j + W_{j,:} v) \quad (3)$$

a probability that the nodes in the hidden layers convert from the visual state to a hidden state is:

$$P(v_j = 1 \mid h) = sigmoid\left(a_j + W_{:,j}^T h\right) \quad (4)$$

an objective function of adjusting the initial parameters of each hidden layer finely through the error back propagation method is:

$$J(W, b) = \frac{1}{m}\sum_{i=1}^{m} J\left(W, b; x^{(i)}, y^{(i)}\right) + \frac{\lambda}{2}\sum_{i=1}^{L-1}\left\|W^{(i)}\right\|_F^2 = \frac{1}{m}\sum_{i=1}^{m}\frac{1}{2}\left\|h\left(x^{(i)}\right) - y^{(i)}\right\|^2 + \frac{\lambda}{2}\sum_{i=1}^{L-1}\left\|W^{(i)}\right\|_F^2 \quad (5)$$

wherein a first term is an error term, and a second term is called a regularization term, wherein the first term and the second term are used to control an element size of a weight matrix of each layer, to prevent the weight matrix from being too large and avoid over-fitting of a network model;

wherein a variable $$\delta_i^{(l)}$$

is a partial derivative of a final error for a variable of a node in each layer before an activation function, wherein the variable $$\delta_i^{(l)}$$

is used to measure a contribution value of a certain node in a certain layer for the final error, and an expression of $$\delta_i^{(l)}$$

is as follows:

$$\delta^{(l)} = \frac{\partial}{\partial z_i^{(l)}} J(W, b; x^{(i)}, y^{(i)}) \tag{6}$$

for a final layer L, $$\begin{aligned} \delta_i^{(L)} &= \frac{\partial}{\partial z_i^{(L)}} \left(\frac{1}{2}\|y - h(x)\|^2\right) \\ &= \frac{\partial}{\partial a_i^{(L)},} \left(\frac{1}{2}\|y - h(x)\|^2\right) \cdot \frac{\partial a_i^{(L)}}{\partial z_i^{(L)}} \\ &= \frac{1}{2}\left[\frac{\partial}{\partial a^{(L)}} \sum_{j=1}^{S_L} (y_j - a_j^{(L)})^2\right] \cdot \frac{\partial a_i^{(L)}}{\partial z_i^{(L)}} \\ &= -(y_i - a_i^{(L)}) f'(z_i^{(L)}) \end{aligned} \tag{7}$$

wherein $$f'(z_i^{(L)}) = a_i^{(L)}(1 - a_i^{(L)}) \tag{8}$$

for other layers (l=L-1, L-2, . . . 2), $$\begin{aligned} \delta^{(l)} &= \frac{\partial}{\partial z_i^{(l)}} J(W, b; x, y) \\ &= \sum_{j=1}^{s_{l+1}} \frac{\partial J}{\partial z_j^{(l+1)}} \cdot \frac{\partial z_j^{(l+1)}}{\partial z_i^{(l)}} \\ &= \sum_{j=1}^{s_{l+1}} \delta_j^{(l+1)} \cdot W_{ji}^{(l)} f'(z_i^{(l)}) \\ &= \left(\sum_{j=1}^{s_{l+1}} W_{ji}^{(l)} \delta_j^{(l+1)}\right) \cdot f'(z_i^{(l)}) \end{aligned} \tag{9}$$

wherein $$z_j^{(l+1)} = \left[\sum_{i=1}^{s_l} W_{ji}^{(l)} \cdot f(z_i^{(l)})\right] + b_j^{(l)} \tag{10}$$

$$\frac{\partial z_j^{(l+1)}}{\partial z_i^{(l)}} = W_{ji}^{(l)} f'(z_i^{(l)}) \tag{11}$$

wherein the weighting matrix W, the visible layer bias coefficient vector a, and the hidden layer bias coefficient vector b are iterated until a difference between two iteration results is less than a preset threshold, and a parameter update method is:

update formulas of various parameters are as follows:

$$W_{ij}^{(l)} = W_{ij}^{(l)} - \alpha \frac{\partial J(W, b)}{\partial W_{ij}^{(l)}} \tag{12}$$

$$b_i^{(l)} = b_i^{(l)} - \alpha \frac{\partial J(w, b)}{\partial b_i^{(l)}} \tag{13}$$

wherein a is a learning rate;

$$\frac{\partial J}{\partial W^{(l)}} = \delta^{(l+1)} (a^{(l)})^T \tag{14}$$

$$\frac{\partial J}{\partial b^{(l)}} = \delta^{(l+1)} \tag{15}$$

for the output layer:

$$\delta^{(L)} = -(y - a^{(L)}) \cdot f(z^{(L)}) \tag{16}$$

for other layers (l=L-1, L-2, . . . 2):

$$\delta^{(l)} = [(W^{(l)})^T \delta^{(l+1)}] \cdot f(z^{(l)}) \tag{17}$$

a partial derivative of an objective function of each sample for each parameter is used as a feedback control signal, and weight update is controlled to minimize a loss function; and step 6: predicting atmospheric visibility: using the prediction set and a trained DBN model to predict the atmospheric visibility.

2. The atmospheric visibility prediction method based on DBN according to claim 1, wherein in step 3, a min-max normalization method is used, and a conversion formula is expressed as:

$$x' = \frac{x - \min(x)}{\max(x) - \min(x)} \tag{18}$$

wherein x' is converted data, max(x) is a maximum value in all data, and min(x) is a minimum value in all data.

3. The atmospheric visibility prediction method based on DBN according to claim 1, wherein in step 3, a Z-score normalization method is used, and a conversion formula is expressed as:

$$x' = \frac{x - \bar{x}}{\sigma} \tag{19}$$

wherein $\bar{x}$ is a mean of all data, and σ is a standard deviation of data.

* * * * *